United States Patent Office 3,030,383
Patented Apr. 17, 1962

3,030,383
PROCESS FOR THE PRODUCTION OF BROMO-7-DIALKYLAMINOCOUMARINS
Geza Schoen, Middlesex, N.J., and Frank J. Marascia, Newark, Del., assignors to American Cyanamid Company, New York, N.Y., a corporation of Maine
No Drawing. Filed Apr. 20, 1959, Ser. No. 807,329
4 Claims. (Cl. 260—343.2)

This invention relates to a process of brominating coumarins. More specifically, it relates to a process of brominating either 4-methyl-7-diethylaminocoumarin or 4-methyl-7-dimethylaminocoumarin in aqueous mineral acid medium, which may be either 20–80% sulfuric acid or stronger than 18% hydrochloric acid, at a temperature between room temperature and 65° C. More specifically it relates to a process of preparing 3-bromo-4-methyl-7-dimethylaminocoumarin by brominating 4-methyl-7-dimethylaminocoumarin in sulfuric acid solution and isolating the corresponding 3-bromo compound. Still more specifically also, it relates to a process of preparing 3-bromo-4-methyl-7-diethylaminocoumarin which comprises dibrominating the corresponding coumarin in sulfuric acid solution, isolating the dibromo coumarin sulfate and treating the same with a base to dehydrobrominate to the 3-bromo compound, and simultaneously to liberate the free coumarin base.

The 3-bromo-4-methyl-7-dialkylaminocoumarins are useful as optical bleaching agents. Because of the green hue of their blue fluorescence they have been found to have special use in the shading of other optical bleaching agents of the coumarin class in order to get neutral shades, since the other common coumarin optical bleaching agents tend to have a red shade of fluorescence.

Brominated 4-methyl-7-dialkylaminocoumarins have been prepared by direct bromination in an organic solvent of a 4-methyl-7-dialkylaminocoumarin. Such a reaction results in a 3,4-dibromo adduct which can be converted to a 3-bromo coumarin by reaction with weakly alkaline reagents. However, bromination in organic solvents is usually an unsatisfactory process, especially for large scale operations. This is true, in part, because of the high cost of organic solvents as well as the safety hazards involved. Further, in this case, the yield of useful products of good quality is quite unsatisfactory. Apparently, further bromination in other positions of the coumarin rings occurs to form bromination products other than the simple adduct. The result is to give poor yields of rather impure products. It is a further disadvantage of past brominations that this reaction in organic solvents requires two distinct steps.

The chemistry involved in these reactions can be illustrated by the following equations

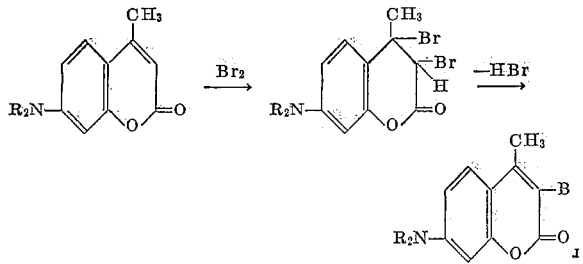

in which R represents either ethyl or methyl.

We have found that the bromination of these coumarin derivatives can be carried out in aqueous mineral acid solutions in specific concentrations, as defined below, at low temperatures, to give good yields of products of high purity. We have further found that the dimethylaminocoumarin derivative behaves rather differently from the diethylaminocoumarin derivative, in that, surprisingly in the case of the former, the dehydrobromination occurs simultaneously with the bromination in the sulfuric acid solution to give good yields of 3-bromo derivative of high purity. We have further found that the 7-diethylaminocoumarin derivative can be brominated in sulfuric acid solution in specific concentration to give a dibromo derivative of quite good purity in excellent yields and that this dibromo derivative can be dehydrohalogenated in the course of isolating the free base by treatment with caustic, to give a 3-bromo derivative of high purity and excellent yield.

It is an advantage of the processes of our invention that one obtains better yields and better purity of products. It is a further advantage of our invention that there are no side reactions tending to produce further brominations in other positions in the molecule. It is also an advantage of our invention that the process can be carried out at ambient temperatures in low cost equipment and that there is no problem in recovery in solvents with the corresponding addition to the cost of the final product. It is most surprising that the bromination of the dimethylamino compound proceeds rapidly to give the 3-bromo compound, in view of the fact that the diethylamino compound goes through an isolatable dibromo compound. It is however, a still more surprising feature of our invention that the corresponding chlorination does not proceed smoothly in mineral acid solution, giving by-products, apparently by attack on other parts of the molecule, which the bromination does not give.

In the process of our invention, the mineral acids which may be used are hydrochloric acid of greater than 18% strength by weight or sulfuric acid of 20–80% strength. The sulfuric acid is preferred. Different strengths of sulfuric acid are preferred with the dimethyl- and diethyl-amino compounds respectively. The temperatures to be used in the process of our invention may vary from ambient to 65° C. In general, it is preferred to use lower temperatures, preferably ambient.

In the process of our invention for the bromination of 4-methyl-7-diethylaminocoumarin, the bromination reaction takes place in a clear-cut fashion to give a 3,4-dibromo compound exclusively, with no appreciable formation of further brominated products. The reaction is carried out using the requisite amount of bromine, approximately stoichiometric, in sulfuric acid of from 20–80% strength at temperatures from room temperature to 65° C. Preferably the reaction is carried out in approximately 40% sulfuric acid at room temperature. The 4-methyl-7-dimethylaminocoumarin is added to the dilute sulfuric acid to form a sulfuric acid salt. Bromine is than added, preferably dropwise, while the reaction mixture is stirred. When the addition of bromine is complete, the reaction mixture is stirred a short time until the reaction of the bromine has been completed. A salt is then added to decrease the solubility of the coumarin, and the dibromo adduct is then removed by filtration in the form of its sulfuric acid salt. The dibromo compound is then converted to the monobromo compound by slurrying the isolated sulfate in dilute alkaline solution which simultaneously converts the salt to the free base and effects dehydrohalogenation to give the 3-bromo compound. If the amount of base used is carefully calculated to neutralize the sulfuric acid only, the dibromo product can be isolated directly at this point.

The reaction can be carried out at temperatures higher than ambient although this is somewhat disadvantageous. However, if it is carried out at higher temperatures in higher concentrated sulfuric acids, the conditions become sufficiently vigorous that hydrogen bromide is, in part, split off spontaneously. Some monobromo compound is then obtained directly, as with the dimethylamino compound, as described below. Thus, for example, 60% sulfuric acid at the boil shows the release of some hydrogen bromide. In 75% sulfuric acid loss of hydrogen bromide starts to take place somewhat lower, at about 80–90° C. In 96% sulfuric acid hydrogen bromide starts to come off at room temperature.

Although this appears to be an attractive one-step preparation of the 3-bromo compound and, in fact, is such for the dimethylamino compound as will be described, as a practical matter, such conditions cannot be used. At such high temperatures there is too much loss of bromine which makes the process costly. Much more important, the loss takes place before the bromination can be completed so that part of the coumarin does not get brominated. Although hydrogen bromide begins to come off at room temperature in 96% sulfuric acid, the reaction with bromine proceeds much too slowly in this concentration to permit this to be a useable medium for bromination.

When operating at room temperature the uptake of bromine is rapid and smooth in sulfuric acid concentrations up to and including about 60%. At higher concentrations, the reaction becomes very sluggish, the yield is decreased and impure products are obtained. Temperatures up to the boiling point of bromine could theoretically be used, but as a practical matter, at the higher temperatures the bromine cannot be retained in the mixture satisfactorily and there is some tarring.

In the dehydrobromination step, the dibromo compound isolated as the sulfate by the addition of salts such as sodium sulfate, is slurried in an aqueous solution. The alkali can be caustic soda, caustic potash, sodium bicarbonate, sodium carbonate, potassium carbonate, lithium carbonate, calcium hydroxide, barium hydroxide and the like, as well as ammonium hydroxide and quaternary ammonium hydroxides. Best results are obtained if a dispersing agent is used in order to achieve rapid contact between the caustic solution and the dibromocoumarin sulfate being dispersed therein. Neutralization of the sulfate and dehydrobromination occurs simultaneously in the one basification. The dibromo intermediate can, of course, be converted to the 3-bromo by other methods known in the art, such as by pasting in 96% sulfuric acid or heating in 60% sulfuric acid. This, however, is an additional step and sacrifices the advantages to be obtained in the processes of my invention in the mere basification of the product to free the amine from the acid salt also effects the dehydrobromination. Thus a step necessary anyway simultaneously accomplishes the dehydrobromination.

With the 4-methyl-7-dimethylaminocoumarin the process of preparing the 3-bromo derivative is even simpler although essentially the same. It consists essentially of the addition of bromine to a mixture of the 4-methyl-7-dimethylaminocoumarin in sulfuric acid of a concentration of 40–80% or of hydrochloric acid of at least 18% concentration. The 3-monobromo derivative is obtained directly in excellent yields. The dibromo derivative is never isolated as such. As the bromine is added, hydrogen bromide is immediately evolved. In acid concentrations below these ranges the evolution of hydrogen bromide is slow and incomplete and the dibromide is obtained. In practice it is preferred that a concentration of about 60% sulfuric acid be used.

The 4-methyl-7-dimethylaminocoumarin is added to the acid of this strength and bromine is then added at room temperature slowly. Hydrogen bromide immediately is evolved and the mixture is stirred until all the bromine has been added and the hydrogen bromide evolution has essentially ceased. Reaction is usually carried out at room temperature or at temperatures close to room temperature, that is not above 35° C., when using such concentrations of sulfuric acid. Higher temperatures can be used but are unnecessary.

In both this and the corresponding bromination of the diethylaminocoumarin sufficient acid is used to allow easy mechanical manipulations such as stirring. This means in practice, a minimum of about 2 parts by volume (or about 3 parts by weight at these concentrations) per part by weight of the coumarin derivative (parts by volume are to parts by weight as cubic centimeters are to grams).

The sulfuric acid solution is then added to water and ice and the mixture made alkaline with a base to free the aminocoumarin from its acid salt. In this case there need be only enough alkali to free the amino compound from the acid, that is to neutralize all the acid. This is in contrast with the diethylamino homolog which requires enough alkali not only to neutralize the sulfuric acid but also to neutralize the HBr in the dehydrohalogenation.

Our invention can be illustrated by the following examples in which parts are by weight unless otherwise specified.

*Example 1*

To 600 ml. of 40% sulfuric acid at room temperature is added with stirring 115.5 g. of 4-methyl-7-diethylaminocoumarin. After stirring for a short time a slurry of the sulfate forms. To the stirred slurry is then added gradually over about 2½ hours, 80 g. of bromine. After addition of the bromine is completed, the mixture is then stirred an additional 1½ hours at room temperature. To it is then added a small amount of a dispersing agent (stearamidopropyldimethyl-hydroxyethylammonium chloride). After the mixture is stirred an additional 10 minutes, 200 g. of anhydrous sodium sulfate is added with a short additional stirring period. The solid dibromocoumarin sulfate is then removed by filtration.

The moist filter cake is pasted with 200 ml. of water and then diluted with 3000 ml. of water. With stirring is added gradually over about half hour 100 ml. of 50% sodium hydroxide solution (to give a positive phenolphthalein end point). After stirring 2½ hours the solid is removed by filtration, washed alkali-free and dried, giving 129 g. of product, or 83.5% of theory of quite pure product.

*Example 2*

To 240 ml. of 75% sulfuric acid is added at room temperature 46.2 g. of 4-methyl-7-diethylaminocoumarin. A small amount of bromine is then added dropwise slowly over about 25 minutes at room temperature. After yellow tarry material begins to separate, the mixture is heated to 70° C. and bromine is then added dropwise with stirring at 70°–75° C. until a total of 32 g. of bromine has been added. Some evolution of hydrogen bromide takes place. The reaction vessel is then swept with dry air for 2 hours, keeping the mixture at 70°–75° C., whereby a large amount of hydrogen bromide and some bromine is eliminated. After cooling, the mixture is diluted with ice to a total of about 600 ml., 200 g. of anhydrous sodium sulfate is added and the mixture is stirred. The solid material is then removed by filtration. The moist filter cake is slurried in 1000 ml. of water and to the mixture is added 50 ml. of 50% sodium hydroxide solution to a pH of about 9. The solid material which forms is removed, giving 43.3 g. (69.9% yield) of 3-bromo-4-methyl-7-diethylaminocoumarin in the form of a yellow solid of good quality and purity. This experiment shows the lower yield and loss of bromine at the higher temperatures.

*Example 3*

In all cases, 11.5 g. of 4-methyl-7-diethylaminocoumarin, 8 g. of bromine and 80 ml. of dilute sulfuric acid are used, following a procedure similar to that described in general in Example 1. These experiments show the loss of hydrogen bromide at higher temperatures.

(A) The reaction is run in 20% sulfuric acid adding the bromine over 15 minutes to the mixture at a temperature of 60–64° C. The mixture is stirred 3½ hours at 65° C. with no evolution of hydrogen bromide. After drowning in a mixture of 25 ml. of 50% sodium hydroxide and 300 g. of ice, a yellow tarry material precipitates which is washed by decantation. Trituration with ethanol transforms this into the crystalline product.

(B) The reaction is run in 40% sulfuric acid, adding the bromine over 20 minutes at 60–64° C. The mixture is stirred 3½ hours at 68° C. with no evolution of hy-

Example 6

The procedure of Example 5 is repeated using different concentrations of sulfuric acid. The amount of sodium hydroxide solution used in the drowning is adjusted in accordance with the amount and concentration of acid used. The results are shown in Table I, which follows. (The results obtained in Example 5 are included in the table as run 3.)

[Using 20.3 g. coumarin derivative and 16 g. bromine]

| Run No. | Acid used | Caustic Used in Drowning | Melting Point, ° C. | Amount | Yield |
|---|---|---|---|---|---|
| 1 | 100 cc. (173 g.) 80% | 50% NaOH plus 25 g. NaHCO₃ | 137, 145–160 | 28.5 | 103.0 |
| 2 | (173 g.) 80% | 148 cc., 50% NaOH, 100 cc., 10% NaHCO₃ | 123, 128–150 | 24.5 | 87.0 |
| 3 | (150 g.) 60% | Same as Run 1 | 158, 160–164 (167–169 Rec.) | 26.3 (19.1) | 93.5 (67.7) |
| 4 | (150 g.) 60% | 96 cc., 50% NaOH plus NaHCO₃ | 144, 158–168 | 23.5 | 83.5 |
| 5 | (130 g.) 40% | Same as Run 1 | 129, 133–152 | 31.0 | 110.0 |
| 6 | (130 g.) 40% | 55 cc., 50% NaOH plus NaHCO₃ | 135, 143–164 | 28.2 | 100.0 |
| 7 | 150 cc. (171 g.) 20% | Same as Run 1 | 100, 105–140 | 26.5 | 94.0 |
| 8 | 100 cc. (114 g.) 20% | 24 cc., 50% NaOH plus NaHCO₃ | 88, 101–160 | 27.3 | 97.0 | drogen bromide and then drowned in a mixture of 75 ml. of 50% sodium hydroxide and 400 g. of ice. A yellow semi-solid precipitates. Trituration with ethanol transforms this into the crystalline product.

(C) the reaction is run in 60% sulfuric acid adding the bromine over 36 minutes at 60–64° C. No precipitate is formed and no hydrogen bromide is evolved. After stirring for a half hour at 65° C., the mixture is drowned in a mixture of 125 ml. of 50% sodium hydroxide and 600 g. of ice. A yellow semi-solid separated which is converted to the crystalline product on trituration with ethanol.

(D) The reaction is run in 80% sulfuric acid. The bromine is added over 3½ hours at 60–64° C. The uptake of bromine is very slow and even after 3½ hours a strong bromine color still remains. Some bromine is lost through the condenser and there is some evolution of hydrogen bromide. The mixture is drowned in 150 ml. of 50% sodium hydroxide and 700 g. of ice. A large amount of oil forms along with a small amount of semi-solid material. Treatment of the oil with ethanol, in which it is soluble, does not produce crystals. The yellow semi-solid product turns crystalline on trituration with ethanol.

Example 4

Samples of 3,4-dibromo-4-methyl-7-diethyl-amino-coumarin (prepared by bromination in CCl₄) are heated in sulfuric acid of various strengths to note the evolution of hydrogen bromide.

(A) In 20% sulfuric acid no hydrogen bromide is evolved even at the boiling point.

(B) In 40% sulfuric acid no hydrogen bromide is evolved even at the boiling point.

(C) In 60% sulfuric acid hydrogen bromide is evolved at the boiling point (about 150° C.).

(D) In 75% sulfuric acid hydrogen bromide is evolved at 65–75° C.

(E) In 95% sulfuric acid hydrogen bormide is evolved at room temperature.

Example 5

To a mixture of 20.3 g. of 4-methyl-7-dimethylamino-coumarin in 100 cc. of 60% sulfuric acid (151 g.) is added over one hour 16 g. of bromine, with stirring. Stirring is continued until the reaction is complete. The mixture is then drowned in 300 g. of ice and water and made alkaline to Brilliant Yellow Indicator by the addition of 50% sodium hydroxide. 25 parts of sodium bicarbonate is added with stirring and the yellow solid product which precipitates is removed by filtration, washed with water and dried. A yield of 26.3 g. of 3-bromo-4-methyl-7-dimethylaminocoumarin is obtained.

Example 7

The procedure of Example 5 is repeated, except that various concentrations and amounts of hydrochloric acid are used. The bromine is added gradually (over about 15-minute period). In the work-up of the product the mixture is drowned in 500 parts of ice and neutralized with 50% sodium hydroxide. The solid product, after isolation by filtration and washed with water, is ground up with solid sodium bicarbonate and the mixture is extracted with water. The solid product is finally removed by filtration. The results are shown in the following table.

[Using 20.3 g. coumarin derivative and 16 g. bromine]

| Run No. | Acid Used | Melting Point, ° C. | Amount | Yield |
|---|---|---|---|---|
| 1 | 100 cc. (119 g.) 37.6% (12 N) | 140, 152–162 | 25.8 | 91.5 |
| 2 | (197.5 g.) 15% (5 N) | 112, 130–161 | 25.5 | 90.3 |
| 3 | (104 g.) 7.5% (2.5 N) | 100, 130–161 | ¹ 29.5 | 104.0 |

¹ Contains acetone insolubles, yield of brightener is 83.5%.

Example 8

3-bromo-4-methyl-7-diethylaminocoumarin was evaluated as an optical bleaching agent by the following procedure:

(A) 5-gram pieces of nylon-tricot, acetate-tricot and satin were dyed with 0.01% and 0.02% on weight of fiber of 3-bromo-4-methyl-7-diethylaminocoumarin in a dyebath at a liquor ratio of thirty to one for 30 minutes at 130° F. The pieces were then rinsed at 75° F. and air dried.

Level dyeings were thus obtained on all the fabrics tested. The hue of the fluorescence was green blue under UV light and a powerful whitening effect was observed in daylight.

(B) The procedure of part (A) was followed except that an 80/20 blend of 4-methyl-7-diethylaminocoumarin with 3-bromo-4-methyl-7-diethylaminocoumarin was used.

Level dyeings were obtained. The hue of fluorescence was a pleasing neutral blue under UV light and a powerful whitening effect was observed in daylight.

We claim:

1. The process of preparing 3-bromo-4-methyl-7-diethylaminocoumarin which comprises gradually adding approximately a stoichiometric quantity of bromine to a mixture of 4-methyl-7-diethylaminocoumarin and at least 3 parts by weight of aqueous sulfuric acid of 20–80% concentration per part of coumarin at a temperature between ambient and 65° C., separating from the reaction the resulting dibromo intermediate and slurrying said dibromo intermediate in a dilute alkaline solution containing at least one equivalent of base per vol. of coumarin in addition to sufficient base to neutralize the sulfuric acid present.

2. The process of claim 1 in which the sulfuric acid strength is approximately 40% and the temperature is 35° C.

3. The process of preparing 3-bromo-4-methyl-7-dimethylaminocoumarin which comprises adding an approximately stoichiometric quantity of bromine to a mixture of 4-methyl-7-dimethylaminocoumarin and at least 3 parts by weight to 40 to 80% sulfuric acid per part of coumarin at a temperature between ambient and 65° C.; agitating the resultant mixture until bormination substantially ceases; downing the reacted mixture in cold water; neutralizing the resultant solution and separating the resultant product.

4. The process of claim 3 in which the sulfuric acid is approximately 60% in strength and the temperature is under 35° C.

References Cited in the file of this patent

Pechmann et al.: Berichte, Deut. Chem. Gesell., vol. 32 (1899), pages 3693–4.

Groggins: Unit Processes in Organic Synthesis, McGraw-Hill, N.Y. (1947), page 227.

Dalvi: Jour. Indian Chem. Soc., vol. 26, #8 (1949), pages 359–365.

UNITED STATES PATENT OFFICE
CERTIFICATE OF CORRECTION

Patent No. 3,030,383　　　　　　　　　　　　　　　　April 17, 1962

Geza Schoen et al.

It is hereby certified that error appears in the above numbered patent requiring correction and that the said Letters Patent should read as corrected below.

Column 2, line 50, for "dimethylaminocoumarin" read -- diethylaminocoumarin --; columns 5 and 6, Example 6, in the table under the heading "Caustic Used in Drowning" line 1, for "NaHOC$_3$" read -- NaHCO$_3$ --.

Signed and sealed this 4th day of September 1962.

(SEAL)
Attest:

ERNEST W. SWIDER
Attesting Officer

DAVID L. LADD
Commissioner of Patents